United States Patent
Wu

(10) Patent No.: US 10,209,737 B2
(45) Date of Patent: Feb. 19, 2019

(54) VIRTUAL REALITY GLASSES

(71) Applicant: Boe Technology Group Co., Ltd., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 246 days.

(21) Appl. No.: 15/128,579

(22) PCT Filed: Oct. 20, 2015

(86) PCT No.: PCT/CN2015/092289
§ 371 (c)(1),
(2) Date: Sep. 23, 2016

(87) PCT Pub. No.: WO2016/176969
PCT Pub. Date: Nov. 10, 2016

(65) Prior Publication Data
US 2018/0181162 A1    Jun. 28, 2018

(30) Foreign Application Priority Data

May 6, 2015  (CN) .......................... 2015 1 0226938

(51) Int. Cl.
*G06F 1/16*    (2006.01)
*G02B 27/01*    (2006.01)

(52) U.S. Cl.
CPC ......... *G06F 1/163* (2013.01); *G02B 27/0172* (2013.01); *G02B 2027/0134* (2013.01)

(58) Field of Classification Search
CPC .......... G06F 1/163; G02B 27/01; G02B 27/22
(Continued)

(56) References Cited

U.S. PATENT DOCUMENTS 9,733,478 B2 *  8/2017  Walsh ................ G02B 27/0172
9,766,459 B2 *  9/2017  Alton ................ G02B 27/0172
(Continued)

FOREIGN PATENT DOCUMENTS

CN       1132558       10/1996
CN       2609303       3/2004
(Continued)

OTHER PUBLICATIONS

Office Action from Chinese Application No. 201510226938.X dated Jul. 25, 2016.
(Continued)

*Primary Examiner* — Byron T Gyllstrom
(74) *Attorney, Agent, or Firm* — Calfee, Halter & Griswold LLP

(57) ABSTRACT

The disclosure relates to a type of virtual reality glasses used to alleviate a view's feeling of fatigue when he or she wears virtual reality glasses for viewing. The virtual reality glasses comprise a housing, a display device, and an optical imaging device disposed within the housing. The optical imaging device is located between the display device and the human eyes. In addition, the virtual reality glasses further comprise a dimming device disposed on the housing wall. When the viewer feels tired after a long time watch through the virtual reality glasses, the viewer may control the dimming device to adjust the ambient light in the virtual reality glasses to improve the background environment inside the virtual reality glasses, thereby alleviating the viewer's feeling of fatigue resulted from viewing through virtual reality glasses worn by him or her.

11 Claims, 2 Drawing Sheets

(58) Field of Classification Search
USPC ........................................................ 362/105
See application file for complete search history.

(56) References Cited

U.S. PATENT DOCUMENTS

| | | | |
|---|---|---|---|
| 2002/0171604 A1 | 11/2002 | Tadysak | |
| 2004/0061663 A1* | 4/2004 | Reynolds | G02B 27/0176 345/8 |
| 2005/0180706 A1* | 8/2005 | Jones | G02B 6/0006 385/115 |
| 2005/0207174 A1 | 9/2005 | Wiemers | |
| 2009/0201466 A1* | 8/2009 | Knecht | A61B 3/113 351/206 |
| 2012/0105483 A1* | 5/2012 | Fedorovskaya | G02B 27/017 345/660 |
| 2013/0021458 A1* | 1/2013 | Inoue | G02B 27/0093 348/56 |
| 2013/0113973 A1* | 5/2013 | Miao | G09G 3/003 348/333.01 |
| 2014/0104142 A1* | 4/2014 | Bickerstaff | G02B 27/017 345/8 |
| 2016/0055822 A1* | 2/2016 | Bell | G02B 27/0172 345/207 |
| 2017/0090194 A1* | 3/2017 | Hayes | G02B 27/0101 |

FOREIGN PATENT DOCUMENTS

| | | |
|---|---|---|
| CN | 101320131 | 12/2008 |
| CN | 201360319 | 12/2009 |
| CN | 101661163 | 3/2010 |
| CN | 102749716 | 10/2012 |
| CN | 202561643 | 11/2012 |
| CN | 103517512 | 1/2014 |
| CN | 203397026 | 1/2014 |
| CN | 104765152 | 7/2015 |
| CN | 204903866 | 12/2015 |
| JP | 2013110725 | 6/2013 |
| WO | 2006036725 | 4/2006 |
| WO | 2010151028 | 12/2010 |
| WO | 2012022042 | 2/2012 |

OTHER PUBLICATIONS

International Search Report from PCT Application No. PCT/CN2015/092289 dated Jan. 29, 2016.
Office Action from China Application No. 201510226938.X dated Dec. 30, 2016.
Decision on Rejection from from China Application No. 201510226938.X dated Apr. 12, 2017.

* cited by examiner

VIRTUAL REALITY GLASSES

RELATED APPLICATIONS

The present application is the U.S. national phase entry of PCT/CN2015/092289, with an international filling date of Oct. 20, 2015, which claims the benefit of Chinese Patent Application NO. 201510226938.X, filed on May 6, 2015, the entire disclosure of which is incorporated herein by reference.

FIELD OF THE INVENTION

The disclosure relates to the field of virtual reality display, and in particular to a type of virtual reality glasses.

BACKGROUND

Virtual reality glasses are a type of virtual reality display. Wearing virtual reality glasses may shield a person's vision from the outside world, and guide the viewer to have a sense of living in a virtual environment. Virtual reality glasses are attracting more and more attention. From Google® Glasses to the holographic glasses newly released by Microsoft®, this type of devices, which display in close range before eyes, bring us a lot of totally new experiences.

There are many types of virtual reality glasses, wherein immersive virtual reality glasses are a type of nontransparent virtual reality glasses. In the prior art, as shown in FIG. 1, immersive virtual reality glasses mainly comprise a housing 101, a display device 102 disposed within the housing 101, an optical imaging device 103 disposed closer to the human eyes than the display device 102, and a buffer layer 104. The display device 102 comprises two display panels disposed corresponding to the left and right eyes; the optical imaging device 103 comprises two lenses disposed corresponding to the left and right eyes, the optical imaging device 103 projects the contents on the display device 102 to the human eyes; and the buffer layer 104 may be in close contact with the human face shape to prevent entry of outside light.

The shortcoming of the prior art is that the viewer when viewing through virtual reality glasses worn by him or her may easily have a feeling of fatigue resulted from the eyes being in a relatively dark viewing environment.

SUMMARY

The disclosure provides a type of virtual reality glasses to alleviate the feeling of fatigue of a viewer when he or she wears the virtual reality glasses for viewing.

According to an aspect, there is provided a type of virtual reality glasses, comprising a housing, a display device, and an optical imaging device disposed within the housing, the optical imaging device being located between the display device and the human eyes, the virtual reality glasses further comprising a dimming device disposed on the housing wall for adjusting the ambient light inside the virtual reality glasses.

According to an embodiment, the dimming device is a light inlet window disposed on the housing wall. When the viewer feels tired after a long time watch at the contents whose luminance changes back and forth between brightness and darkness on the display device in the virtual reality glasses, the light inlet window is opened, the outside light comes through the light inlet window into the housing of the virtual reality glasses, thereby improves the background environment inside the virtual reality glasses, and then alleviates the viewer's feeling of fatigue resulted from viewing through virtual reality glasses worn by him or her.

In certain exemplary embodiments, the light inlet window comprises a window blocking sheet and a blocking sheet guide rail. With this solution, it is possible to flexibly adjust the opening size of the light inlet window, thereby flexibly adjusting the brightness of the background environment inside the virtual reality glasses and then improving the flexibility and the degree of comfort for the viewer to operate the light inlet window, and thus further alleviating the viewer's feeling of fatigue resulted from viewing through virtual reality glasses worn by him or her.

In certain exemplary embodiments, the light inlet window is disposed between the optical imaging device and the human eyes and beyond the human eye angular field of view. In this way, the introduced outside light may be prevented from irradiating and irritating the human eyes, thereby the degree of comfort of the viewer when viewing can be improved.

In certain exemplary embodiments, the light inlet window is disposed on a side wall of the housing. In this solution, because the distance between the two side walls of the housing is usually greater than the distance from the upper wall to the lower wall, the light inlet window may be disposed on a side wall of the housing and beyond the human eye angular field of view, so as to be able to provide a fine viewing environment for the viewer.

In certain exemplary embodiments, there are a plurality of light inlet windows distributed on the two side walls of the housing. In this way, the introduced light can be more evenly distributed in the internal environment of the virtual reality glasses, so that the viewer's two eyes may acquire balanced light and then the fatigue of the viewer's two eyes can be alleviated in a balanced manner.

According to certain embodiments, the dimming device is an ambient lamp disposed on the inner wall of the housing.

In the technical solution of an embodiment, an ambient lamp is disposed on inner wall of the housing. When the viewer feels tired after a long time watch at the contents whose luminance changes back and forth between brightness and darkness on the display device in the virtual reality glasses, the ambient lamp is turned on, the ambient lamp provides ambient light in the housing, thereby improving the background environment inside the virtual reality glasses and then alleviating the viewer's feeling of fatigue resulted from viewing through virtual reality glasses worn by him or her.

In certain exemplary embodiments, the ambient lamp is a red ambient lamp. In a dark environment, the red ambient lamp has less damaging effects on the visual purple in the human retinal cells, being conducive to the protection of the viewer's eyesight.

In certain exemplary embodiments, the brightness of the ambient lamp is not higher than three times that of the display device. In this way, it is possible to prevent the display device from irritating the viewer's eyes, thereby enabling the viewer to obtain better viewing effect.

In certain exemplary embodiments, the ambient lamp is disposed on an inner side wall of the housing between the optical imaging device and the human eyes and beyond the human eye angular field of view, so as to be able to prevent light rays of the provided ambient light from irradiating and irritating the human eyes, thereby improving the degree of comfort of the viewer when viewing.

In certain exemplary embodiments, the ambient lamp is disposed on the inner wall of the housing. In this solution, because the distance between the two side walls of the housing is usually greater than the distance from the upper wall to the lower wall, the ambient lamp may be disposed on the inner side wall of the housing and beyond the human eye angular field of view, so as to be able to provide a good viewing environment for the viewer.

In certain exemplary embodiments, there are a plurality of ambient lamps distributed on the two inner side walls of the housing, and thus the introduced light can be more evenly distributed in the internal environment of the virtual reality glasses, so that the viewer's two eyes may acquire balanced light and then the fatigue of the viewer's two eyes can be alleviated in a balanced manner.

DETAILED DESCRIPTION

To alleviate the feeling of fatigue of a viewer when he or she wears virtual reality glasses for viewing, an embodiment provides a type of virtual reality glasses. The virtual reality glasses comprise a housing, and a display device and an optical imaging device disposed within the housing. The optical imaging device is located between the display device and the human eyes. The virtual reality glasses further comprise a dimming device disposed on the housing wall for adjusting the ambient light inside the virtual reality glasses. When the viewer feels tired after a long time watch at the contents whose luminance changes back and forth between brightness and darkness on the display device in the virtual reality glasses, by controlling the dimming device, the viewer can improve the background environment inside the virtual reality glasses, thereby alleviate his or her feeling of fatigue resulted from viewing through virtual reality glasses worn by him or her.

To make the objective, technical solution and advantages of the embodiments herein clearer, the embodiments are further explained with reference to the accompanying drawings.

REFERENCE SIGNS

101—Housing;
102—Display Device;
103—Optical Imaging Device;
104—Buffer Layer;
201—Housing;
202—Display Device;
203—Optical Imaging Device;
205—Light Inlet Window;
206—Blocking Sheet Guide Rail;
207—Window Blocking Sheet;
301—Housing;
302—Display Device;
303—Optical Imaging Device;
304—Buffer Layer;
305—Ambient Lamp.

Figure 1:
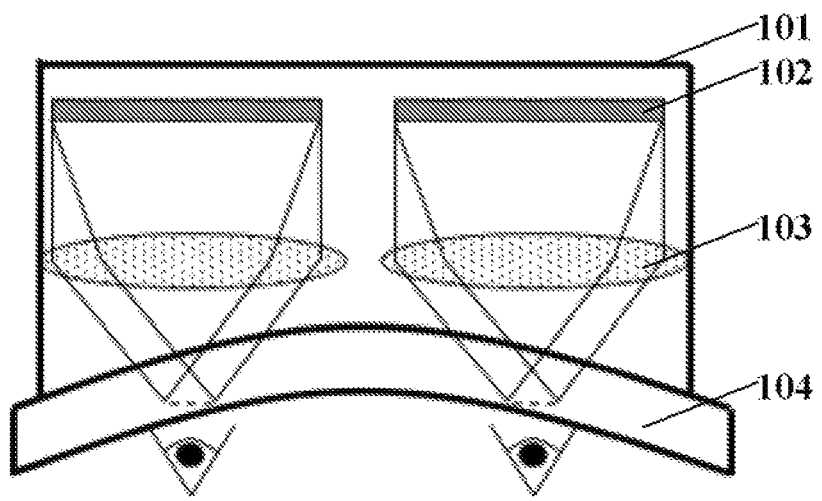
FIG. 1 is a schematic diagram of the structure of virtual reality glasses in the prior art.
Figure 2:
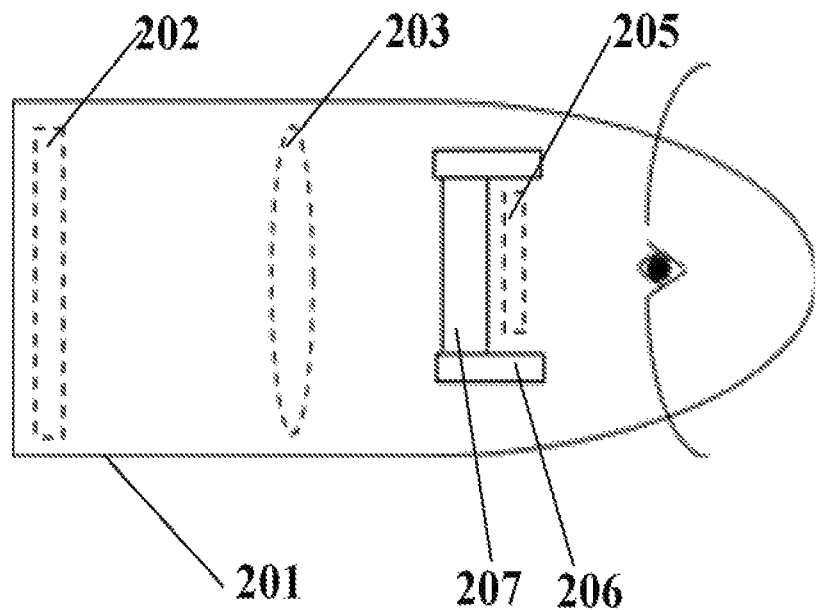
FIG. 2 is a schematic diagram of the structure of virtual reality glasses according to certain embodiments.

As shown in FIG. 2, the virtual reality glasses provided an embodiment comprise a housing 201, and a display device 202 and an optical imaging device 203 disposed within the housing 201, the optical imaging device 203 being located between the display device 12 and the human eyes. The virtual reality glasses further comprise a light inlet window 15 disposed on the housing wall.

In certain embodiments, the specific types of the display device 202 are not limited. The display device 202 may comprise two display panels disposed corresponding to the left and right eyes; besides, the display device 202 may also comprise one display panel, and this display panel comprises two display regions disposed corresponding to the left and right eyes. The optical imaging device 203 may comprise two lenses disposed corresponding to the left and right eyes, and the types of the optical imaging device 203 are not limited. For example, the optical imaging device 203 may comprise an assembly of lens of different types.

In the technical solution of the above embodiment, a light inlet window 205 is disposed on the housing wall. When the viewer feels tired after a long time watch at the contents whose luminance changes back and forth between brightness and darkness on the display device 202 in the virtual reality glasses, the light inlet window 205 is opened, the outside light comes through the light inlet window 205 into the housing 201 of the virtual reality glasses, thereby improving the background environment inside the virtual reality glasses and then alleviating the viewer's feeling of fatigue resulted from viewing through virtual reality glasses worn by him or her.

Continue to see FIG. 2, where the light inlet window 205 comprises a window blocking sheet 207 and a blocking sheet guide rail 206. Adjusting the position of the window blocking sheet 207 on the blocking sheet guide rail 206 may adjust the opening size of the light inlet window 205 and control the amount of incoming outside light, thereby flexibly adjusting the brightness of the background environment inside the virtual reality glasses. With this design, it is possible to improve the degree of comfort for the viewer when viewing and to further alleviate the viewer's feeling of fatigue when viewing. It is noted that the light inlet window 205 may also be other types than this push-pull one, such as bi-parting, rolling-up curtain and so on, and no specific limitations are made here.

As shown in FIG. 2, in this embodiment, the light inlet window 205 is disposed on the housing wall between the optical imaging device 203 and the human eyes and beyond the human eye angular field of view. The light inlet window 205 being disposed beyond the human eye angular field of view may prevent the introduced outside light from irradiating the human eyes, thereby reducing the irritation to the human eyes and further improving the degree of comfort of the viewer when viewing.

In the above embodiment, the specific position of the light inlet window 205 is not limited. For example, it may be disposed on the upper wall, lower wall or side wall of the housing 201. Because the distance between the two side walls of the housing 201 is usually greater than the distance from the upper wall to the lower wall, the light inlet window 205 may be disposed on a side wall of the housing 201 and beyond the human eye angular field of view so as to be able to provide a good viewing environment for the viewer.

As shown in FIG. 2, there are a plurality of light inlet windows 205 distributed on the two side walls of the housing 201, and thus the introduced light can be more evenly distributed in the internal environment of the virtual reality glasses, so that the viewer's two eyes may acquire more balanced light and the fatigue of both eyes may be alleviated.

Figure 3:
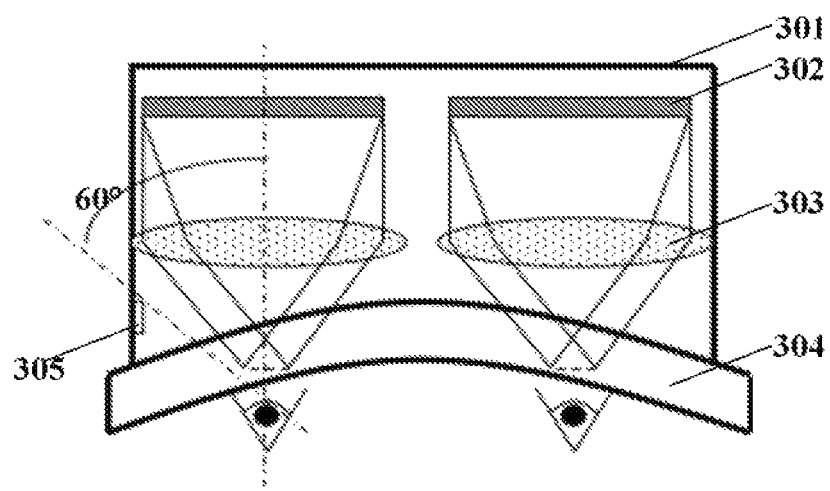
FIG. 3 is a schematic diagram of the structure of virtual reality glasses according to certain embodiments.

As shown in FIG. 3, certain embodiments provide a type of virtual reality glasses, comprising a housing 301, and a display device 302 and an optical imaging device 303 disposed within the housing 301. The optical imaging device 303 is located on the side of the display device 12 close to the human eyes. The virtual reality glasses further comprises an ambient lamp 305 disposed on an inner side wall of the housing.

In an embodiment, the specific types of the display device 302 are not limited. The display device 302 may comprise two display panels disposed corresponding to the left and right eyes; besides, the display device 302 may also comprise one display panel, and this display panel comprises two display regions disposed corresponding to the left and right eyes. The optical imaging device 303 may comprise two lenses disposed corresponding to the left and right eyes. The types of the optical imaging device 303 are not limited. For example, the optical imaging device 303 may comprise an assembly of lens of different types.

In the embodiment, in order to prevent outside light from entering and, at the same time, to improve the degree of comfort for wearing the virtual reality glasses, a buffer layer 304 is disposed on a part of the outer wall of the housing 301 that is in contact with the human face.

In the technical solution of an embodiment, an ambient lamp 305 is to disposed on an inner side wall of the housing 301. When the viewer feels tired after a long time watch at the contents whose luminance changes back and forth between brightness and darkness on the display device 302 in the virtual reality glasses, the ambient lamp 305 is turned on and provide ambient light in the housing 301 of the virtual reality glasses, thereby improving the background environment inside the virtual reality glasses and then alleviating the viewer's feeling of fatigue resulted from viewing through virtual reality glasses worn by him or her.

In certain exemplary embodiments, the ambient lamp is a red ambient lamp. There is a photosensitive material called visual purple in the columnar cells on the human retina. The visual purple is synthetized by vitamin A and a type of protein. At night, the columnar cells, when receiving photic stimulation, needs a certain amount of vitamin A to take part in the chemical reaction to produce vision. If one is been working long time in a dark environment and vitamin A is consumed too much or is not supplemented in time, the visual purple will decrease and the eyesight will reduce in dim light. As the red ambient lamp has less damaging effects on the visual purple, in a dark environment, setting the ambient lamp to be a red ambient lamp is conducive to the protection of the viewer's eyesight.

In certain embodiments, too great a brightness of the ambient lamp will irritate the viewer's eyes. In order to allow the viewer to acquire better viewing effects, the brightness of the ambient lamp 305 is not higher than three times that of the display device 302.

As shown in FIG. 3, the ambient lamp 305 is disposed between the optical imaging device 303 and the human eyes and beyond the human eye angular field of view. Thus it is possible to prevent light rays of the provided ambient light from irradiating and irritating the human eyes, thereby improving the degree of comfort of the viewer when viewing.

In the above embodiment, the specific position of the ambient lamp 305 is not limited. For example, it may be disposed on the upper wall, lower wall or side wall of the housing 301. Because the distance between the two side walls of the housing 301 is usually greater than the distance from the upper wall to the lower wall, the ambient lamp 305 may be disposed on an inner side wall of the housing 301 and beyond the human eye angular field of view so as to be able to provide a good viewing environment for the viewer.

As shown in FIG. 3, there may be a plurality of ambient lamps 305 distributed on the two inner side walls of the housing 301. Thus the introduced light can be more evenly distributed in the internal environment of the virtual reality glasses, so that the viewer's two eyes may acquire balanced light and further the fatigue of both eyes can be alleviated in a balanced manner.

Apparently, a person having ordinary skill in the art is able to make various modifications and variations to this invention without departing from the spirit and scope of this invention. Therefore, if these modifications and variations to this invention fall within the scope of this invention's claims and equivalent techniques thereof, this invention is intended to include these modifications and variations.

The invention claimed is:

1. Virtual reality glasses comprising: a housing, a display device, and an optical imaging device disposed within the housing, the optical imaging device being located between the display device and the human eyes, wherein the virtual reality glasses comprise:
   a dimming device configured to adjust the ambient light inside the virtual reality glasses;
   wherein the dimming device comprises an ambient lamp disposed on an inner wall of the housing, and the ambient lamp is disposed between the optical imaging device and the human eyes and beyond the human eye angular field of view.

2. The virtual reality glasses of claim 1, wherein the dimming device further comprises a light inlet window disposed on the housing wall.

3. The virtual reality glasses of claim 2, wherein the light inlet window comprises a window blocking sheet and a blocking sheet guide rail.

4. The virtual reality glasses of claim 2, wherein the light inlet window is disposed between the optical imaging device and the human eyes and beyond the human eye angular field of view.

5. The virtual reality glasses of claim 4, wherein the light inlet window is disposed on a side wall of the housing.

6. The virtual reality glasses of claim 5, wherein a plurality of light inlet windows are distributed on the two side walls of the housing.

7. The virtual reality glasses of claim 1, wherein the ambient lamp comprises a red ambient lamp.

8. The virtual reality glasses of claim 7, wherein the brightness of the ambient lamp is not higher than three times that of the display device.

9. The virtual reality glasses of claim 7, wherein the brightness of the ambient lamp is not higher than three times that of the display device.

10. The virtual reality glasses of claim 1, wherein the ambient lamp is disposed on an inner side wall of the housing.

11. The virtual reality glasses of claim 10, wherein a plurality of ambient lamps are distributed on the two inner side walls of the housing.

* * * * *